United States Patent
Teranishi

(10) Patent No.: US 9,460,315 B2
(45) Date of Patent: Oct. 4, 2016

(54) ORDER-PRESERVING ENCRYPTION SYSTEM, DEVICE, METHOD, AND PROGRAM

(75) Inventor: Isamu Teranishi, Tokyo (JP)

(73) Assignee: NEC Corporation, Tokyo (JP)

(*) Notice: Subject to any disclaimer, the term of this patent is extended or adjusted under 35 U.S.C. 154(b) by 5 days.

(21) Appl. No.: 14/117,801

(22) PCT Filed: May 17, 2012

(86) PCT No.: PCT/JP2012/003239
§ 371 (c)(1),
(2), (4) Date: Nov. 14, 2013

(87) PCT Pub. No.: WO2012/157279
PCT Pub. Date: Nov. 22, 2012

(65) Prior Publication Data
US 2014/0089678 A1    Mar. 27, 2014

(30) Foreign Application Priority Data

May 18, 2011    (JP) .................................. 2011-111599

(51) Int. Cl.
  *H04L 9/06* (2006.01)
  *G06F 21/72* (2013.01)
  *G06F 21/62* (2013.01)
  *H04L 9/28* (2006.01)
  *H04L 9/30* (2006.01)

(52) U.S. Cl.
  CPC ........... *G06F 21/72* (2013.01); *G06F 21/6227* (2013.01); *H04L 9/0618* (2013.01); *H04L 9/28* (2013.01); *H04L 9/30* (2013.01)

(58) Field of Classification Search
  CPC ........................................................ H04L 9/06
  USPC ........................................................ 713/189
  See application file for complete search history.

(56) References Cited

U.S. PATENT DOCUMENTS

| | | |
|---|---|---|
| 2005/0147240 A1 | 7/2005 | Agrawal et al. |
| 2005/0147246 A1* | 7/2005 | Agrawal et al. ................. 380/44 |
| 2006/0026338 A1* | 2/2006 | Ebara et al. .................... 711/103 |
| 2007/0038579 A1 | 2/2007 | Ansley |
| 2008/0282096 A1 | 11/2008 | Agrawal et al. |
| 2009/0327748 A1 | 12/2009 | Agrawal et al. |
| 2012/0121080 A1* | 5/2012 | Kerschbaum ................... 380/28 |
| 2012/0163586 A1* | 6/2012 | Jho et al. ........................ 380/28 |

OTHER PUBLICATIONS

Boldyreva, A. et al., "Order-Preserving Symmetric Encryption", EUROCRYPT 2009, Lecture Notes in Computer Science, vol. 5479, p. 224-241.

(Continued)

Primary Examiner — William Powers
(74) Attorney, Agent, or Firm — Wilmer Cutler Pickering Hale and Dorr LLP

(57) ABSTRACT

An order-preserving encryption system has an encryption means which generates a ciphertext as a sum of data which complies with a distribution X determined in advance, and the encryption means generates the ciphertext using the distribution X represented in a format that data of a bit length determined at random is selected at random according to a distribution matching the bit length.

12 Claims, 7 Drawing Sheets

(56) References Cited

OTHER PUBLICATIONS

International Search Report corresponding to PCT/JP2012/003239, dated Jul. 10, 2012, 3 pages.
Written Opinion of the International Search Authority corresponding to PCT/JP2012/003239, mailing date Jul. 17, 2012, 4 pages.
Extended European Search Report issued by the European Patent Office for European Application No. 12786276.1 dated Dec. 23, 2014 (8 pages).
Chinese Office Action issued by the Patent Office of the People's Republic of China for Application No. 201280021751.0 dated May 29, 2015 (12 pages).

* cited by examiner

ORDER-PRESERVING ENCRYPTION SYSTEM, DEVICE, METHOD, AND PROGRAM

CROSS-REFERENCE TO RELATED APPLICATIONS

This application is a national stage application of International Application No. PCT/JP2012/003239 entitled "Order-Preserving Encryption System, Device, Method, and Program," filed on May 17, 2012, which claims the benefit of the priority of Japanese patent application No. 2011-111599, filed on May 18, 2011, the disclosures of each of which are hereby incorporated by reference in their entirety.

TECHNICAL FIELD

The present invention relates to an order-preserving encryption system, an encryption device, an order-preserving encryption method, and an order-preserving encryption program.

BACKGROUND ART

A cryptosystem is used to guarantee data confidentiality in communication. There is a system disclosed in, for example, Non Patent Literature 1 as a related technique.

CITATION LIST

Non Patent Literature

NPL 1: Alexandra Boldyreva, Nathan Chenette, Younho Lee and Adam O'Neill, Order-Preserving Symmetric Encryption. EUROCRYPT 2009, pp. 224-241

SUMMARY OF INVENTION

Technical Problem

Although the cryptosystem is used to guarantee data confidentiality in communication, making data perfectly confidential is not necessarily useful in terms of application, and making data too confidential undermines usefulness in some cases.

For example, there is a problem upon comparing small and large sizes of two items of numerical value data. Although, if two items of data can be directly read, small and large sizes of m and m' can be compared, when m and m' are encrypted according to a cryptosystem such as AES or DES and stored, even if these ciphertexts are read, the small and large sizes of m and m' cannot be compared. Although the small and large sizes of m and m' can be compared by decrypting these ciphertexts and decrypting m and m', a private key is required to decrypt the ciphertexts, and therefore the user who does not know the private key cannot compare small and large sizes. Further, decryption requires calculation cost, and therefore it is not easy even for the user who knows a private key to compare small and large sizes of multiple data.

The above matter becomes a significant problem in a secure database in particular. This is because it is not desirable to store a plaintext as is in a database from a viewpoint of security, and therefore it is necessary to encrypt and store a plaintext. Storing a key of these ciphertexts in the database makes encryption meaningless, and then it is necessary to compare small and large sizes of data encrypted without a key. Further, even if it is possible to obtain a key, multiple items of data are stored in the database, and therefore decrypting all items of multiple data and comparing small and large sizes of data are not realistic in terms of efficiency.

Furthermore, it is expected that, accompanying recent development in a cloud computing technique, users are increasingly storing data in a database on a cloud. Hence, a technique of comparing small and large sizes of encrypted data in a database is highly likely to become very important in the near future.

As the authors of Non Patent Literature 1 acknowledge, security of the system proposed by Non Patent Literature 1 is only imperfectly observed, which causes a problem upon putting this system into practical use.

It is therefore an object of the present invention to provide an order-preserving encryption system, an encryption device, an order-preserving encryption method and an order-preserving encryption program which perform order-preserving encryption which can guarantee security.

Solution to Problem

An order-preserving encryption system according to the present invention has an encryption means which generates a ciphertext as a sum of data which complies with a distribution X determined in advance, and the encryption means generates the ciphertext using the distribution X represented in a format that data of a bit length determined at random is selected at random according to a distribution matching the bit length.

An encryption device according to the present invention has an encryption means which generates a ciphertext as a sum of data which complies with a distribution X determined in advance, and the encryption means generates the ciphertext using the distribution X represented in a format that data of a bit length determined at random is selected at random according to a distribution matching the bit length.

An order-preserving encryption method according to the present invention includes: generating a ciphertext as a sum of data which complies with a distribution X determined in advance; and generating the ciphertext using the distribution X represented in a format that data of a bit length determined at random is selected at random according to a distribution matching the bit length.

An order-preserving encryption program according to the present invention causes a computer to execute encryption processing of generating a ciphertext as a sum of data which complies with a distribution X determined in advance, and the computer is caused in the encryption processing to generate the ciphertext using the distribution X represented in a format that data of a bit length determined at random is selected at random according to a distribution matching the bit length.

Advantageous Effects of Invention

The present invention can perform order-preserving encryption which can guarantee security.

DESCRIPTION OF EMBODIMENTS

Figure 1:
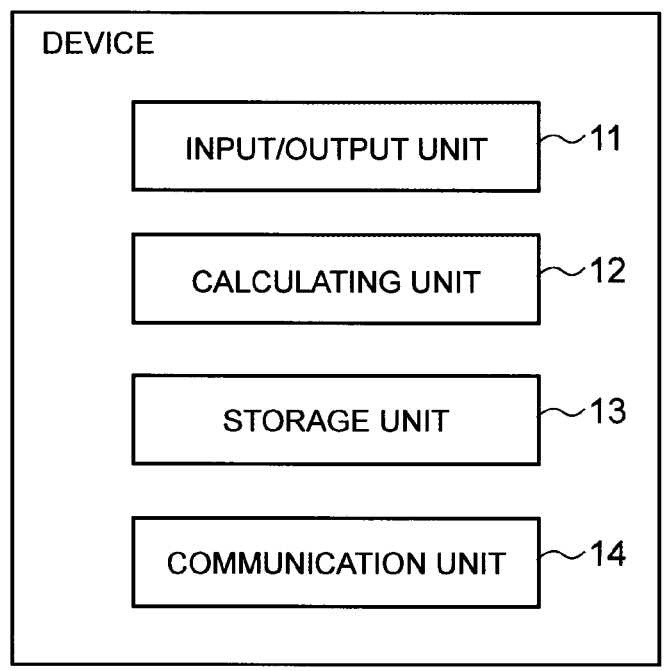
FIG. 1 It depicts a block diagram illustrating a configuration example of a device according to the present invention.

First, ideas common to all of a first to third exemplary embodiments described below will be described. $\{1, \ldots, N\}$ is plaintext space. Further, X is a probability distribution that outputs positive values in almost all cases, and $\zeta$ is a constant. As to $i \in \{-\zeta, \ldots, N\}$, a ciphertext of a plaintext $m \in \{1, \ldots, N\}$ in the first to third exemplary embodiments can be written in a form of $Enc(K, m) = \Sigma_{i=-\zeta, \ldots, m}\alpha[i]$. Meanwhile, $\alpha[i]$ is a random number matching a probability distribution X, and only those who know a private key K can calculate $\alpha[i]$.

To decrypt a ciphertext C, m satisfying $C = \Sigma_{i=-\zeta, \ldots, m}\alpha[i]$ is output as a plaintext. Although $Enc(K, m)$ is a sum of $-\zeta$ to m in the present invention, when $Enc(K, m)$ is a sum of 0 to m, a ciphertext $Enc(K, 1)$ of 1 takes a simple form of $Enc(K, 1) = \alpha[1]$, and therefore security is not guaranteed.

According to the present invention, when m on a right side of $Enc(K, m) = \Sigma_{i=-\zeta, \ldots, m}\alpha[i]$ is higher, a value of $\alpha[i]$ to be added increases. Therefore, when m is higher, $Enc(K, m)$ is higher. Accordingly, when m<m' is true, $Enc(K, m) < Enc(K, m')$ is true.

Although the present invention can principally be executed with respect to arbitrary X, a distribution preferably provides a higher number of bits at a lower probability from a viewpoint of security. When X satisfies this property, each $\alpha[m]$ is selected according to X, and $\alpha[m]$ has a longer bit length than those of $\alpha[m+1]$, $\alpha[m+2]$, and . . . at a lower probability. In this case, $\alpha[m]$ which is a random number of a longer bit length hides $\alpha[m+1]$, $\alpha[m+2]$, and . . . which are random numbers of shorter bit lengths, and therefore $\alpha[m]$, $\alpha[m]+\alpha[m+1]$, $\alpha[m]+\alpha[m+2]$, and . . . take almost same values and cannot be identified. Hence, $Enc(K, m) = \Sigma_{i=-\zeta, \ldots, m}\alpha[i]$, $Enc(K, m+1) = \Sigma_{i=-\zeta, \ldots, m+1}\alpha[i]$, $Enc(K, m+2) = \Sigma_{i=-\zeta, \ldots, m+2}\alpha[i]$, and . . . cannot be identified, so that security is guaranteed.

As X which satisfies the above property, for example, a distribution defined as follows can be used. $p[1], \ldots,$ and $p[U]$ are non-negative integers which become $p[1]+ \ldots +p[U]=1$, and $n[1], \ldots,$ and $n[U]$ are non-negative integers. $D[p[1], \ldots,$ and $p[U]]$ provide $j=i$ at a probability $p[i]$ in a probability distribution for outputting an integer j. $B[1]$ is a probability distribution for outputting a non-negative integer of a bit length equal to or less than a length $n[1]$, and $B[U]$ is a probability distribution for outputting a non-negative integer of a bit length equal to or less than a length $n[U]$. X is a distribution which complies with when $\alpha$ is selected according to a method of "selecting the integer j according to $D[p[1], \ldots,$ and $p[U]]$ and then selecting $\alpha$ according to $B[j]$".

When X is defined as described above, X outputs a non-negative integer of a bit length equal to or less than the length $n[1]$ at the probability $p[1]$, outputs a non-negative integer of a bit length $n[2]$ longer than n [1] at the probability $p[2]$, and outputs a non-negative integer of a bit length $n[3]$ longer than $n[2]$ at the probability $p[3]$ . . . . Hence, when $p[1], \ldots,$ and $p[U]$, and $n[1], \ldots,$ and $n[U]$ are appropriately selected, X satisfies the above property.

Next, an outline of the first exemplary embodiment described below will be described below. In the first exemplary embodiment, the private key K is defined according to $K=(\alpha[-\zeta], \ldots, \alpha[N])$, and the ciphertext $Enc(K, m) = \Sigma_{i=-\zeta, \ldots, m}\alpha[i]$ is obtained by calculating the sum of $\alpha[1], \ldots,$ and $\alpha[m]$ upon encryption.

Further, to decrypt the given ciphertext C, $\Sigma_{i=-\zeta, \ldots, m}\alpha[i]$ is calculated for each m, and m which provides $C = \Sigma_{i=-\zeta, \ldots, m}\alpha[i]$ is found.

In the first exemplary embodiment, upon encryption of m, it is necessary to add up $m+\zeta+1$ items of data $\alpha[-\zeta], \ldots,$ and $\alpha[m]$ and therefore a calculation amount of encryption is proportional to the size of m. Further, a calculation amount of decryption is proportional to a size of m likewise. Hence, although, according to the present exemplary embodiment, it is possible to provide an effect when m is smaller, efficiency is less than the other exemplary embodiments described below when m is higher.

Next, an outline of the second exemplary embodiment described below will be described below. Similar to the first exemplary embodiment, although a ciphertext $Enc(K, m)$ of m is $Enc(K, m) = \Sigma_{i=-\zeta, \ldots, m}\alpha[i]$ in the second exemplary embodiment, encryption and decryption are performed by a more efficient method. In the second exemplary embodiment, a distribution $B[j]$ is a binominal distribution $B(\tau[j], q)$ to realize efficient encryption and decryption.

Meanwhile, $\tau[1], \ldots, \tau[U]$ and q are parameters. Further, the binominal distribution $B(k, p')$ is a distribution which the number of times that a top of a coin appears when a coin where the probability that the top of the coin appears is p' is thrown k times complies with.

Symbols are defined to describe details of the second exemplary embodiment to describe the property of the ciphertext according to the present invention. When a set of i in which $\alpha[i]$ is selected according to $B[j]$ is $S[j]$, a set of sources of $S[j]$ equal to or less than m is $S[m, j]$, $\Sigma_{i \in S[m, j]}\alpha[i]$ is $C[m, j]$, and a ciphertext $Enc(K, m)$ of m is written as $C[m]$, $C[m] = \Sigma_{j=1, \ldots, U}C[m, j]$ holds according to the definition of $C[m]$.

The number of sources of $S[m, j]$ is $n[m, j]$. A fact is found that, when i belongs to $S[m, j]$, each $\alpha[i]$ complies with the distribution $B[j]$, $S[m, j]$ has $n[m, j]$ sources, and, according to a reproductive property of a binominal distribution, $C[m, j] = \Sigma_{i \in S[m, j]}\alpha[i]$ complies with a distribution $B(\tau[j]n[m, j], q)$.

$vecn[m] = (n[m, 1], \ldots, n[m, U])$ is true, and, as to a vector $vecu = (u[1], \ldots, u[U])$, $s(vecu)$ is $\Sigma_{j=1, \ldots, U}\tau[j]u[m]$. A fact is found that $C[m] = \Sigma_{j=1, \ldots, U}C[m, j]$ is true, and, according to the reproductive property of the binominal distribution, $C[m]$ complies with the distribution $B(s(vecn[m]), q)$.

Hence, a distribution which $C[m]$ complies with is determined depending on $vecn[m]$. Similarly, a fact is found that, as to a plaintext m, $m' < m$, $C[m] - C[m']$ complies with a distribution $B(s(vecn[m]-vecn[m']), q)$. Hereinafter, vecn $[m]-vecn[m']$ is referred to as a "distribution determining parameter" on $\{m'+1, \ldots, m\}$. $vecn[m]=vecn[m]-vec[-\zeta-1]$ is true, and $vecn[m]$ is a distribution determining parameter on $\{-\zeta-1, \ldots, m\}$. Hereinafter, $vecn[m]$ is also referred to as a "distribution determining parameter".

For $vecp'=(p'[1], \ldots, p'[U])$ satisfying $\Sigma_{i=1,\ldots,U}p'[i]=1$, $vecB(k, vecp')$ is a distribution for determining an output $vecn'=(n'[1], \ldots, n'[U])$ according to a method of "setting a number equal to j among values $a[1], \ldots, a[k]$ as $n'[j]$ when k values $a[1], \ldots, a[k]$ are independently selected according to a random variable X that a probability that a numerical value i is $p'[i]$". A fact is found that the probability that $\alpha[i]$ is selected according to $B[j]$ is $p[j]$, and, when $vecp'(p[1], \ldots, p[U])$ is true, $vecn[m]=(n[m, 1], \ldots, n[m, U])$ complies with a distribution $vecB(m+\zeta+1, vecp)$ according to the reproductive property of a binominal distribution.

$Algo(k, p')$ is an algorithm of selecting an output according to a binominal distribution $B(k, p')$, and $vecAlgo(k, vecp')$ is an algorithm of selecting an output according to a distribution $vecB(k, vecp')$.

In the second exemplary embodiment, a ciphertext $C[M]$ of M which is a maximum source belonging to plaintext space is calculated as follows using the above-described fact.

First, a distribution determining parameter $vecn[M]$ is selected for M according to $vecAlgo(M+\zeta+1, vecp)$. Next, $C[M]$ is selected according to a distribution $Algo(s(vecn[M]), q)$.

A ciphertext $C[M]$ is calculated recursively using other ciphertexts. Recursion according to the present invention is used in a state where some plaintext u, v>u satisfies the following conditions.

A ciphertext $C[u]$ of u and a ciphertext $C[v]$ of v are calculated.

The distribution determining parameter vecn on $\{u+1, \ldots, v\}$ is calculated.

A plaintext m of which ciphertext needs to be calculated belongs to a section $\{u+1, \ldots, v\}$.

In an initial state, u and v are set to $-\zeta-1$ and M, respectively. In the initial state, $C[u]$ is 0, and $C[v]$ and vecn are $C[M]$ and $vecn[M]$ which have already been calculated. Further, in the initial state, the section $\{u+1, \ldots, v\}$ matches with plaintext space, and then the plaintext m the ciphertext of which needs to be calculated belongs to the section $\{u+1, \ldots, v\}$. Consequently, the above conditions are satisfied in the initial state.

The ciphertext of m is recursively calculated according to a bisection method using a function $RecEnc(K', u, v, C[u], C[v], vecn, m)$ as follows. Meanwhile, K' is a random number sequence which is part of a private key. Further, $Ceil(x)$ is a function of outputting a value obtained by rounding up a decimal point or less of an input actual number x.

When m=u is true, $C[u]$ is output, and, when m=v is true, $C[v]$ is output.

$w=Ceil(u+v/2)$ is calculated.

The distribution determining parameter vecn' on $\{u+1, \ldots, w\}$ is calculated according to a function $Dist(u, v, w, vecn)$. Meanwhile, as a random number used by $vecDist(u, v, w, vecn)$, a pseudo random number sequence selected using K' is used.

By using vecn', $C[w]$ is selected according to a distribution $Dist(C[u], C[v], vecn, vecn')$ which "a ciphertext of w under a condition that the ciphertext of u and the ciphertext of v are $C[u]$, and $C[v]$ complies with". For a random number used to select $C[w]$ according to $Dist(C[u], C[v], vecn, vecn')$, a pseudo random number sequence selected using K' is used.

When m≤w is true, $RecEnc(K', u, w, C[u], C[w], vecn', m)$ is recursively executed.

If not, $RecEnc(K', w, v, C[w], C[v], vecn-vecn', m)$ is recursively executed.

A pseudo random number is used to select a source from $Dist(C[u], C[v], vecn, vecn')$ according to the above algorithm in order to guarantee that the same ciphertext $C[w]$ is output at all times for the same $(C[u], C[v], vecn, vecn')$. The above algorithm is executed with respect to various inputs m, and $C[w]$ is calculated. $C[w]$ is a ciphertext of w, and a value $C[w]$ needs to take the same value at all times irrespectively of m. However, using a true random number to calculate $Dist(C[u], C[v], vecn, vecn')$ does not guarantee that the same value is not taken at all times. Meanwhile, a value of the pseudo random number sequence is deterministically determined, so that using a pseudo random number sequence instead of a true random number guarantees that $Dist(C[u], C[v], vecn, vecn')$ outputs the same value $C[w]$ at all times.

Functions $HG(k, t, l)$ and $vecHG(k, vect, l)$ are defined as follows. Meanwhile, k, t and l are non-negative integers. Further, $vect=(t[1], \ldots, t[U])$ is a vector formed with non-negative integers $t[1], \ldots, t[U]$ satisfying $\Sigma_{i=1,\ldots,U}t[i]$.

$HG(k, t, l)$: is a probabilistic algorithm which determines an output according to a distribution (hypergeometric distribution) which the number of black balls among selected balls complies with when l balls are selected from a bottle including k–t white balls and t black balls.

$vecHG(k, vect, l)$: is a probabilistic algorithm which determines an output $n'=(n'[1], \ldots, n'[U])$ according to the following distribution: there are k balls in the bottle. When the l balls are selected under a condition that one of marks $1, \ldots,$ and U are written on balls and the number of balls marked i is $t[i]$, the number of balls marked i included among the selected balls is $n'[j]$.

In this case, above $vecDist(u, v, w, vecn)$ and $Dist(C[u], C[v], vecn, vecn')$ are $vecDist(u, v, w, vecn)=vecHG(v-u, vecn, w-u; cc)$, $Dist(C[u], C[v], vecn, vecn')=C[u]+HG(s(vecn), C[v]-C[u], s(vecn'); cc')$. Meanwhile, a symbol "$A(x;r)$" means "an output upon execution of $A(x)$ using r as a random number". cc and cc' are pseudo random number sequences selected using K'.

Similar to the above-described encryption algorithm, a decryption algorithm according to the second exemplary embodiment is executed recursively according to the bisection method. A difference between the encryption algorithm and the decryption algorithm according to the second exemplary embodiment are as follows.

A portion that reads "$C[u]$ is output upon m=u and $C[v]$ is output upon m=v" in the encryption algorithm changes to read "u is output upon $C=C[u]$, v is output upon $C=C[v]$ and a message that C is an invalid ciphertext upon u=v is output". Meanwhile, C is a ciphertext which needs to be decrypted. Further, a difference is that RecDec is recursively invoked instead of recursively invoking RecEnc.

Next, an outline of a third exemplary embodiment described below will be described below. Although a case has been described with the third exemplary embodiment where a binominal distribution $B(\tau[j], q)$ is used as $B[j]$, a distribution which principally satisfies the following property performs the same operation as that in the second exemplary embodiment.

When $\alpha[j], \ldots, \alpha[k]$ are selected according to $B[j], \ldots, B[k]$, it is easy to select sources from a distribution which $\alpha[j] + \ldots + \alpha[k]$ comply with.

Under a condition that "as to each j, the number of sources of $S[j]$ belonging to a section $\{u+1, \ldots, v\}$ is $n[j]$", it is easy to select a source from a distribution which "the number of sources of $S[j]$ belonging to a section $\{u+1, \ldots, \text{Ceil}(u+v/2)\}$" complies with.

Under conditions that a ciphertext of u is $C[u]$, a ciphertext of v is $C[v]$, and, "as to each j, the number of sources of $S[j]$ belonging to the section $\{u+1, \ldots, v\}$ is $n[j]$", it is easy to select a source from a distribution which a ciphertext of $w=\text{Ceil}(u+v/2)$ complies with.

For example, as $B[j]$, a normal distribution $N(\tau[j], V[j])$ and $\tau[j]=V[j]=2^{j\lambda}/2$ can be used. Meanwhile, $N(\mu, V)$ represents a normal distribution $\mu$ of which is an average and V of which is a dispersion. In this case, an operation is performed by replacing Algo and Dist with adequate functions Algo' and Dist' in the second exemplary embodiment and changing the numbers of bits of the pseudo random number sequences cc and cc'.

Finally, security according to the second exemplary embodiment will be described. As described above, a ciphertext according to the second exemplary embodiment is the same as a ciphertext according to the invention of the first exemplary embodiment. Therefore, security according to the second exemplary embodiment is the same as security according to the first exemplary embodiment. Security can be guaranteed as described above according to the first exemplary embodiment, which guarantees security according to the second exemplary embodiment.

First Exemplary Embodiment

A configuration of an order-preserving encryption system according to the present invention will be described with reference to FIGS. 1 and 2. As illustrated in FIG. 1, each device (an encryption device 100, a decryption device 200 and a key generating device 300 illustrated in FIG. 2) according to the present exemplary embodiment has an input/output unit 11, a calculation unit 12, a storage unit 13 and a communication unit 14. These devices are realized by information processing devices such as personal computers which operate according to, for example, programs. Further, in this case, the input/output unit 11, the calculating unit 12, the storage unit 13 and the communication unit 14 are realized by, for example, a keyboard, a CPU, a memory and a network interface unit respectively. Furthermore, as illustrated in FIG. 2, in the present exemplary embodiment, the order-preserving encryption system has the encryption device 100, the decryption device 200 and the key generating device 300.

In the present exemplary embodiment, the encryption device 100 includes an encryption means 101. Further, the decryption device 200 includes a decryption means 201. Although a case will be hereinafter described where two types of devices of the encryption device 100 and the decryption device 200 are used, one device may be configured to include both of an encryption means and a decryption means. Further, although an encryption algorithm and a decoding algorithm will be described below, more specifically, a CPU of one or a plurality of information processing devices which realizes the order-preserving encryption system executes processing according to these algorithms.

In the storage units 13 of the encryption device 100 and the decryption device 200, bit sequences K (referred to as "keys K" below) which are keys are stored in advance. The key K is generated by a means called a key generating means. An example illustrated in FIG. 2 assumes a case where the key generating device 300 is prepared separately from the encryption device 100 and the decryption device 200, and this device includes the key generating means 301 and executes processing of generating the key K. However, the present invention is not limited to this example, the key generating means may be configured to be included in the encryption device 100, the decryption device 200 or a third device different from these devices, and execute processing of generating the key K. From the viewpoint of security, the key K needs not to be known by devices other than the encryption device 100 or the decryption device 200, and therefore the encryption device 100 or the decryption device 200 desirably includes the key generating means and executes processing of generating the key K.

Figure 2:
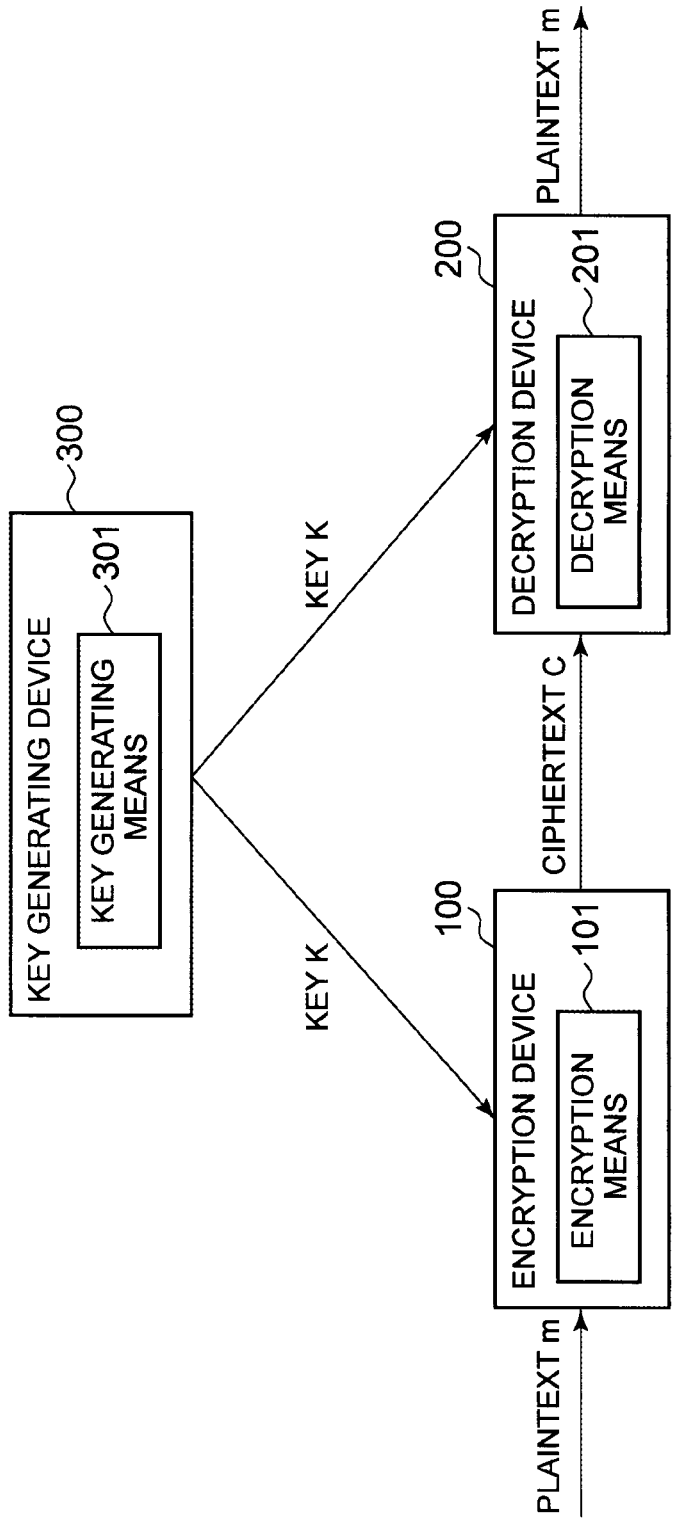
FIG. 2 It depicts an explanatory view illustrating an inter-device relationship according to the present invention.

Data input and output by each means illustrated in FIG. 2 is as follows.

The key generating means 301 generates the key K and outputs the generated key K. More specifically, the key generating means 301 is realized by a CPU of an information processing device which operates according to a program.

The encryption means 101 receives an input of the key K and the plaintext m, encrypts the received plaintext m using the key K and outputs a ciphertext C. More specifically, the encryption means 101 is realized by a CPU of an information processing device which operates according to a program.

The decryption means 201 receives an input of the key K and the ciphertext C, decrypts the received ciphertext C using the key K and outputs the plaintext m. More specifically, the decryption means 201 is realized by a CPU of an information processing device which operates according to a program.

In the present exemplary embodiment, processing is executed according to the following process. In addition, the keys K generated by the key generating means 301 in advance are written in the storage units 13 of the encryption device 100 and the decryption device 200.

First, the encryption device 100 writes the plaintext m received by the input/output unit 11 as an input, in the storage unit 13.

Next, the encryption device 100 reads the key K and the plaintext m from the storage unit 13, executes encryption processing of the key K and the plaintext m as an input by means of the encryption means 101 and calculates the ciphertext C as the output.

Next, the encryption device 100 transmits the ciphertext C from the communication unit 14 to the decryption device 200.

The decryption device 200 receives the ciphertext C using the communication unit 14. Further, the decryption device 200 reads the key K from the storage unit 13, executes decoding processing of the key K and the ciphertext C as an input by means of the decryption means 201 and calculates the plaintext m as an output.

Next, details of processing executed by the order-preserving encryption device will be described. Hereinafter, $\{1, \ldots, M\}$ is plaintext space, and U, $\lambda$ and $\zeta$ are constants. As to $i=1, \ldots, U$, $B[i]$ is a probability distribution. As $B[j]$, for example, a uniform distribution on a section $\{0, \ldots, \tau[j]\}$ or a binominal distribution $B(\tau[j], p[j])$ and a normal distribution $N(\tau[j], V[j])$ can be used.

From a viewpoint of security, $\lambda$ is a value equal to or more than 80. $\tau[j]$, $p[j]$, and $V[j]$ are, for example, $\tau[j]=V[j]=2^{j\lambda}$, and $p[j]=q$.

Algorithms of calculating a binominal distribution and a normal distribution are disclosed in, for example, a cited reference (YOTSUJI, Tetsuaki, "Probability Distribution Random Number Generating Method for Calculator Simulation", Pleiades Publishing House, June 2010).

p[1], . . . , p[U] are non-negative integers and satisfy $\Sigma_{i=1, \ldots, U} p[i]=1$, and vecp'(p[1], . . . , p[U]) is true. vecBernoulli (vecp) is an algorithm of outputting a value of 1 or more and U or less, and outputs j at a probability p[j]. Although vecBernoulli (vecp) may be realized by any method, for example, vecBernoulli (vecp) is realized by the following method. Meanwhile, $P[k]=\Sigma_{i=1, \ldots, k} p[i]$ is true. Further, P[0]=0 is true.

x is uniformly selected at random from a section $\{0, \ldots, 2^{\lambda}\}$.

j which provides $2^{\lambda} P[j-1]<x \leq 2^{\lambda} P[j]$ is found and this j is output.

Parameters M, U, $\zeta$, $\lambda$ and vecp are stored in the storage unit 13 of each device, and each device can use these values where necessary.

Next, processing executed by the key generating means will be described. The details of the processing executed by the key generating means 301 according to the present exemplary embodiment are as follows.

Figure 3:
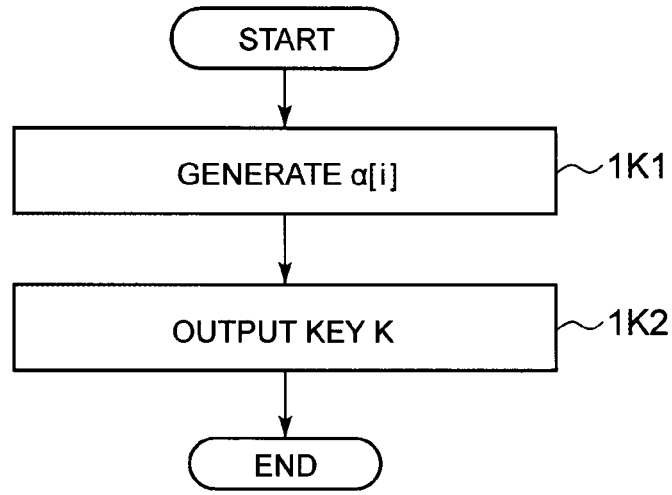
FIG. 3 It depicts a flowchart illustrating key generation processing according to a first exemplary embodiment.

The key generating means 301 executes the following processing with respect to $i=-\zeta, \ldots, N$ (step 1K1 in FIG. 3).

The key generating means 301 executes vecBernoulli (vecp), and obtains an output j[i] (1K1).

The key generating means 301 selects $\alpha[i]$ according to B[j[i]] (1K1).

Next, the key generating means 301 outputs $K=(\alpha[-\zeta], \ldots, \alpha[N])$ as the key K (step 1K2 in FIG. 3). In the present exemplary embodiment, the key generating mean 301 outputs the key K to the encryption device 100 and the decryption device 200.

Next, processing executed by the encryption means will be described. The details of the processing executed by the encryption means 101 according to the present exemplary embodiment are as follows.

Figure 4:
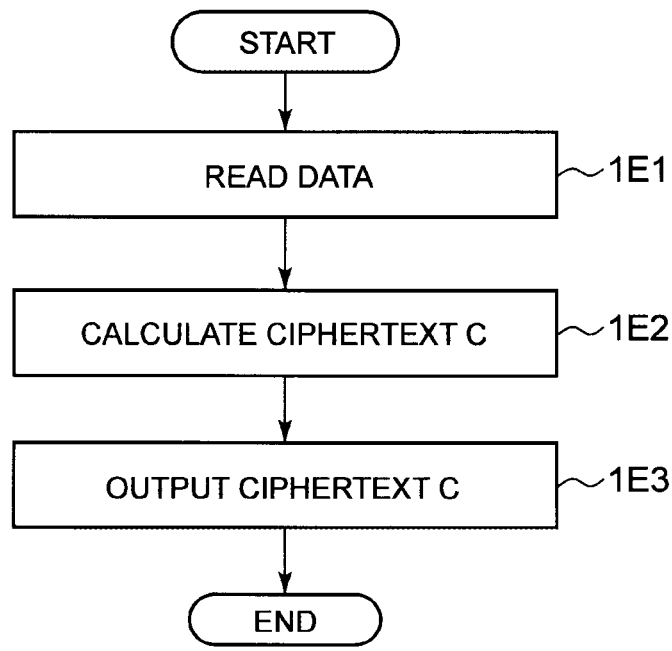
FIG. 4 It depicts a flowchart illustrating encryption processing according to the first exemplary embodiment.

The encryption means 101 reads the key $K=(\alpha[-\zeta], \ldots, \alpha[N])$ and the plaintext m from the storage unit 13 (step 1E1 in FIG. 4).

Next, the encryption means 101 calculates $C=\Sigma_{i=-\zeta, \ldots, m} \alpha[i]$ (step 1E2 in FIG. 4).

Next, the encryption means 101 outputs C as the ciphertext C (step 1E3 in FIG. 4). In the present exemplary embodiment, the encryption means 101 outputs the ciphertext C to the decryption device 200.

Next, processing executed by the decryption means will be described. The details of the processing executed by the decryption means 201 according to the present exemplary embodiment are as follows.

Figure 5:
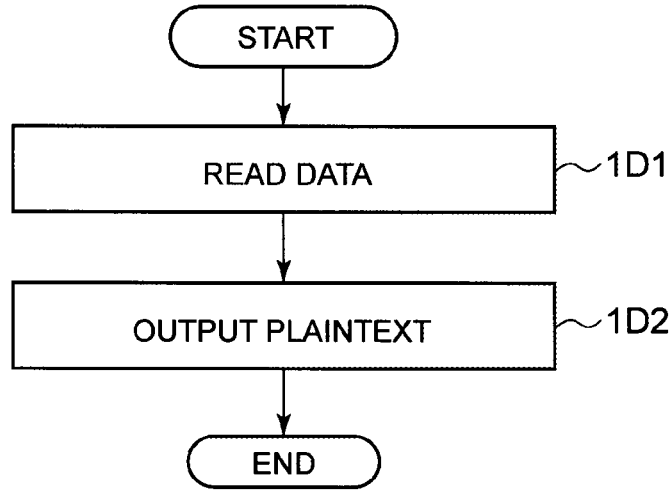
FIG. 5 It depicts a flowchart illustrating decryption processing according to the first exemplary embodiment.

The decryption means 201 reads the key $K=(\alpha[-\zeta], \ldots, \alpha[N])$ and the ciphertext C from the storage unit 13 (step 1D1 in FIG. 5).

The decryption means 201 calculates $S=\Sigma_{i=-\zeta, \ldots, 0} \alpha[i]$ (step 1D2 in FIG. 5).

Next, when $C \leq S$ is true, the decryption means 201 outputs a message indicating that the ciphertext is invalid, and makes abnormal stop (step 1D2). Meanwhile, when $C \leq S$ is not true, the decryption means 201 executes following processing (1) and (2) with respect to i=1, N (step 1D2).

(1) $S+\alpha[i]$ is newly set as S (step 1D2).

(2) When $C \leq S$ is true, i is output as a decrypting result and a regular stop is made (step 1D2).

Further, when an input is invalid data, the decryption means 201 outputs a message that a ciphertext is invalid and makes an abnormal stop (step 1D2). In addition, notification is not limited to an output of a message and may be provided in any way as long as that a ciphertext is invalid can be notified.

As described above, according to the present exemplary embodiment, it is possible to efficiently compare small and large sizes of plaintexts in an encrypted state in which security is guaranteed.

Second Exemplary Embodiment

A device configuration and parameters M, U, $\zeta$, $\lambda$ and vecp according to the second exemplary embodiment are the same as those in the first exemplary embodiment. Meanwhile, the present exemplary embodiment differs from the first exemplary embodiment in a function of each means.

In the present exemplary embodiment, $\rho$ is a parameter in addition to the configuration according to the first exemplary embodiment. From a viewpoint of security, $\rho$ is a value equal to or more than 160 bits. Further, in the present exemplary embodiment, $\tau[1], \ldots, \tau[U]$ are parameters. From a viewpoint of security, $\tau[j+1]/\Sigma[j]$ is a value equal to or more than $2^{\lambda}$. When, for example, $\tau[j]=2^{j\lambda}$ is true, this property is satisfied. Each parameter is stored in the storage unit 13 of each device, and each device can use these values where necessary.

As to a vector vecu=(u[1], . . . , u[U]), s(vecu) is $\Sigma_{j=1, \ldots, U} \tau[j] u[m]$. Algo, vecAlgo, Dist and vecDist are the following algorithms.

Algo(k, p'): selects an output according to a binominal distribution B(k, p').

vecAlgo(k, vecp'): selects an output according to a distribution vecB(k, vecp') described in the above outline.

Dist(C1, C2, vecn, vecn'): outputs C1+HG(s(vecn), C2−C1, s(vecn')). Meanwhile, HG is a function described in the above outline.

vecDist(u, v, w, vecn): outputs vecHG(v−u, vecn, w−u). Meanwhile, vecHG is a function described in the above outline.

Algorithms of calculating a binominal distribution and HG are disclosed in, for example, a cited reference (YOTSUJI, Tetsuaki, "Probability Distribution Random Number Generating Method for Calculator Simulation", Pleiades Publishing House, June 2010).

vecAlgo(k, vecp') can be calculated according to, for example, the following method. Meanwhile, vecp'=(p'[1], . . . , p'[U]), and $\Sigma_{j=1, \ldots, U} p'[j]=1$ are true.

1. k'=k is true.

2. Following (1) and (2) are executed with respect to j=1, . . . , U−1.

(1) n[j] is selected according to the binominal distribution B(k, p'[j]).

(2) k' is overwritten by k'−n[j].

3. n[U]=k' is true.

4. vecn=(n[1], . . . , n[U]) is output.

vecHG(k, vect, l) can be calculated according to, for example, the following method. Meanwhile, vect=(t[1], . . . , t[U]), and $\Sigma_{j=1, \ldots, U} t[j]=k$ are true.

1. k'=k and l'=l are true.

2. Following (1) and (2) are executed with respect to j=1, . . . , U−1.

(1) HG(k', t[j], l') is executed, and an output n[j] is obtained.

(2) k'−t[j] is overwritten by k', and l'−n[j] is overwritten by l'.

3. n[U]=l' is true.

4. vecn=(n[1], . . . , n[U]) is output.

Next, processing executed by the key generating means will be described. The details of the processing executed by the key generating means 301 according to the present exemplary embodiment are as follows.

Figure 6:
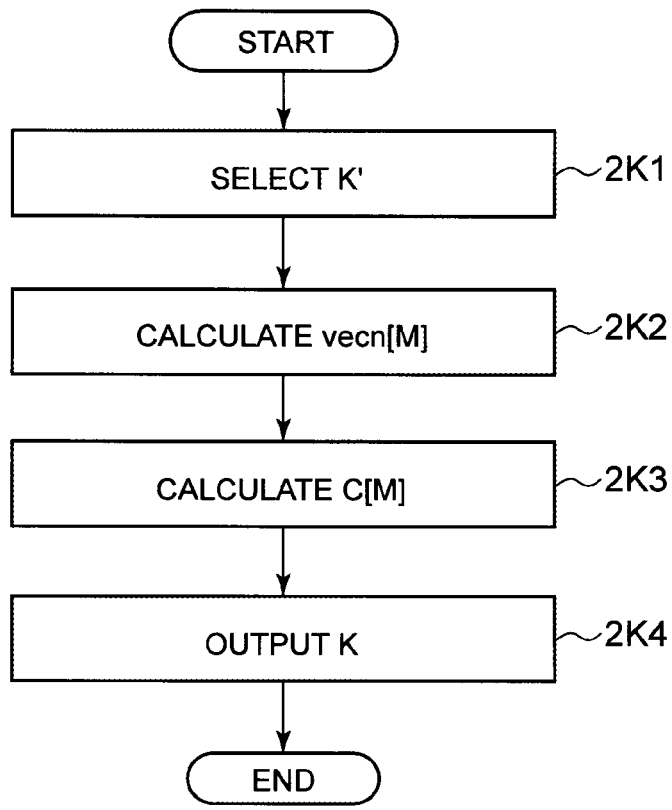
FIG. 6 It depicts a flowchart illustrating key generation processing according to a second exemplary embodiment.

The key generating means 301 selects a bit sequence K' of p bits at random (step 2K1 in FIG. 6).

Next, the key generating means 301 executes vecAlgo (M+ζ+1, vecp), and obtains an output vecn[M] (step 2K2 in FIG. 6).

Next, the key generating means 301 executes Algo(s(vecn [M]), q), and obtains an output C[M] (step 2K3 in FIG. 6).

Next, the key generating means 301 outputs K=(K', vecn[M], C[M]) (step 2K4 in FIG. 6).

Ceil(x) is a function of outputting a value obtained by rounding up a decimal point or less of an input actual number x, the numbers of bits of a random number used for calculation by algorithms Dist and vecDist are L and L', PRF(K, •) is a pseudo random function using K as a key, an output is a pseudo random numbers of L bits, PRF'(K, •) is a pseudo random function using K as a key, and an output is a pseudo random number of L' bits. Further, a symbol "a∥b" represents coupling between bit sequences a and b, and, for an algorithm A, "A(x; r)" represents "an output obtained by executing A(x) using r as a random number".

An algorithm RecEnc(K', u, v, C[u], C[v], vecn, m) is recursively defined as follows.

Figure 7:
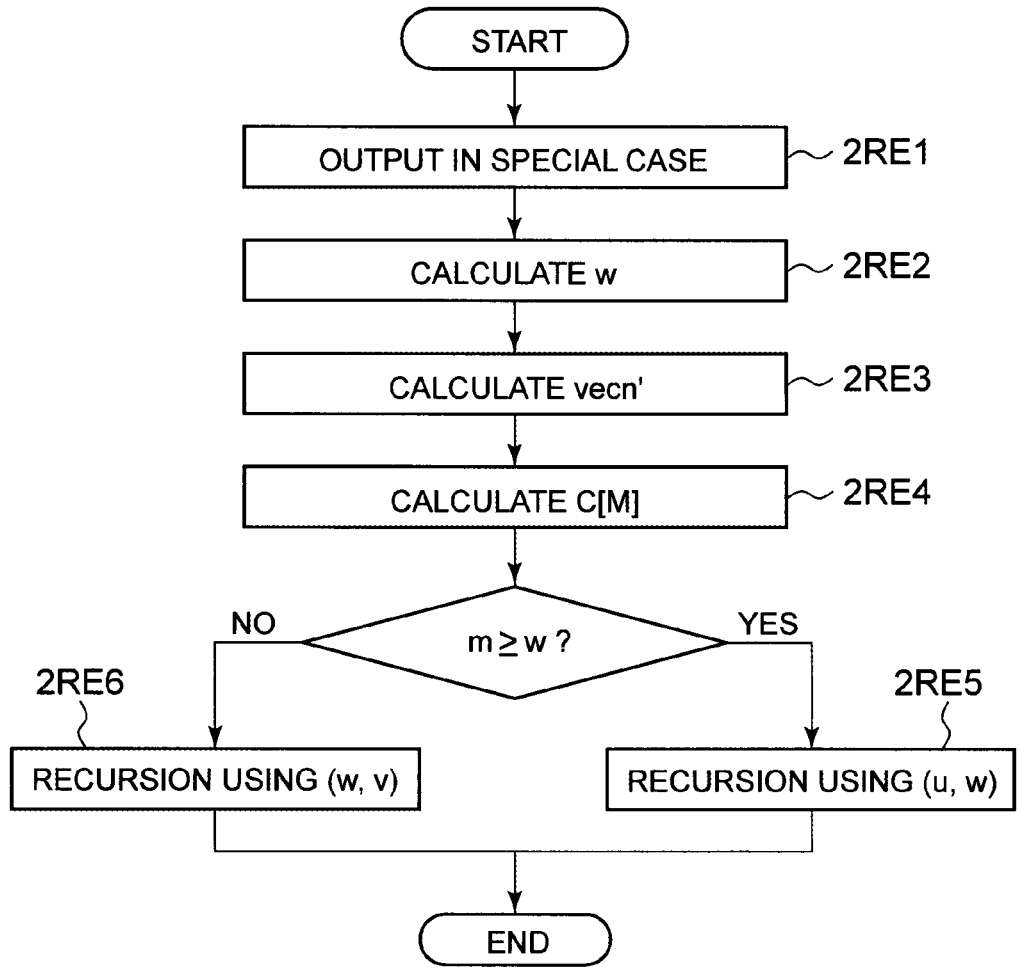
FIG. 7 It depicts a flowchart illustrating a RecEnc algorithm according to the second exemplary embodiment.

When m=u is true, C[u] is output, and, when m=v is true, C[v] is output (step 2RE1 in FIG. 7).

Next, w=Ceil((u+v)/2) is calculated (step 2RE2 in FIG. 7).

Next, cc'=PRF(K',(v−u∥vecn∥w−u)) is calculated (step 2RE3 in FIG. 7). Further, vecn'=vecDist(u, v, w, vecn; cc) is calculated (step 2RE3 in FIG. 7).

Next, cc'=PRF'(K', s(vecn)∥(C[v]−C[u])∥s(vecn')) is calculated (step 2RE4 in FIG. 7). Further, C[w]=Dist(C[u], C[v], vecn, vecn'; cc') is calculated (step 2RE4 in FIG. 7).

Next, when m≤w is true, RecEnc(K', u, w, C[u], C[w], vecn', m) is output (step 2RE5 in FIG. 7).

Meanwhile, when m>w is true, RecEnc(K', w, v, C[w], C[v], vecn−vecn', m) is output (step 2RE6 in FIG. 7).

Next, processing executed by the encryption means will be described. The details of the processing executed by the encryption means 101 according to the present exemplary embodiment are as follows.

Figure 8:
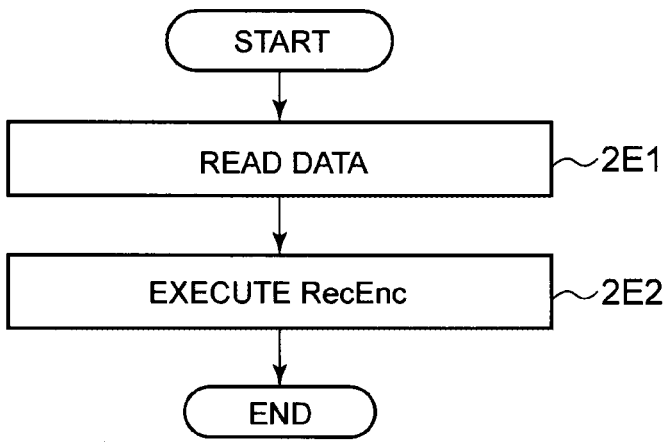
FIG. 8 It depicts a flowchart illustrating encryption processing according to the second exemplary embodiment.

An encryption means 101 receives K=(K', C[M], vecn [M]) as an input (step 2E1 in FIG. 8).

Next, the encryption means 101 executes RecEnc'(K',−1, M, 0, C[M], vecn[M], m) (step 2E2 in FIG. 8).

The algorithm RecDec(K', u, v, C[u], C[v], vecn, m) is recursively defined as follows.

Figure 9:
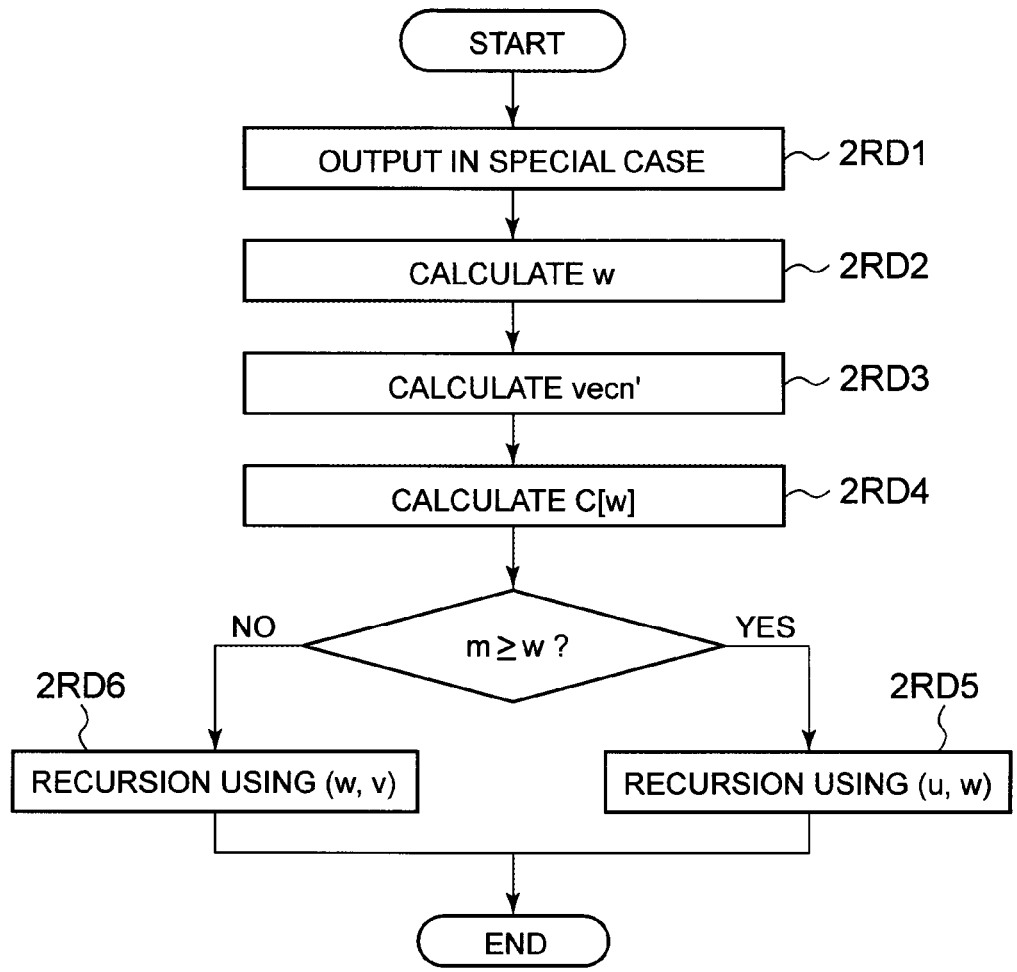
FIG. 9 It depicts a flowchart illustrating the RecEnc algorithm according to the second exemplary embodiment.

When u≤0 is true, the following processing is performed (step 2RD1 in FIG. 9). More specifically, when C=C[u] is true, u is output, when m=C[v] is true, v is output and, when u=v is true, a message indicating that a ciphertext is invalid is output (step 2RD1 in FIG. 9).

Next, w=Ceil((u+v)/2) is calculated (step 2RD2 in FIG. 9).

Next, cc=PRF(K',(v−u∥vecn∥w−u)) is calculated (step 2RD3 in FIG. 9). Further, vecn'=vecDist(u, v, w, vecn; cc) is calculated (step 2RD3 in FIG. 9).

Next, cc'=PRF'(K', s(vecn)∥(C[v]−C[u])∥s(vecn')) is calculated (step 2RD4 in FIG. 9). Further, C[w]=Dist(C[u], C[v], vecn, vecn'; cc') is calculated (step 2RD4 in FIG. 9).

Next, when m≤w is true, RecDec(K', u, w, C[u], C[w], vecn', m) is output (step 2RD5 in FIG. 9).

Meanwhile, when m>w is true, RecDec(K', w, v, C[w], C[v], vecn−vecn', m) is output (step 2RD6 in FIG. 9).

Next, processing executed by the decryption means will be described. The details of the processing executed by the decryption means 201 according to the present exemplary embodiment are as follows.

Figure 10:
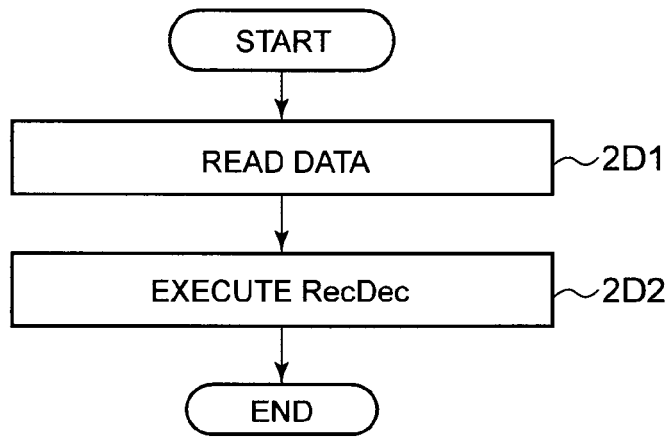
FIG. 10 It depicts a flowchart illustrating decryption processing according to the second exemplary embodiment.

A decryption means 201 receives K=(K', C[M], vecn[M]) as an input (step 2D1 in FIG. 10).

Next, the decryption means 201 executes RecDec'(K', −ζ−1, M, 0, C[M], vecn[M], m) (step 2D2 in FIG. 10).

As described above, according to the present exemplary embodiment, it is possible to efficiently compare small and large sizes of plaintexts in an encrypted state in which security is guaranteed. Further, according to the present exemplary embodiment, it is possible to perform encryption and decryption processing by a more efficient method than that in the first exemplary embodiment.

Third Exemplary Embodiment

A device configuration and parameters M, U, ζ, λ and vecp according to the third exemplary embodiment are the same as those in the first exemplary embodiment. Meanwhile, the present exemplary embodiment differs from the first exemplary embodiment in a function of each means.

In the present exemplary embodiment, V[1], ..., V[n] are parameters, and, as to vecu=(u[1], u[U]), t(vecn[M])= $\Sigma_{i=1,\ldots,U} u[i] V[i]$ is true in addition to a configuration of the first exemplary embodiment.

V[j] can be set as, for example, V[j]=$2^{jλ}$. Normal(μ, V) is an algorithm of selecting an output according to a normal distribution of an average μ and a dispersion V. In key generation processing according to the third exemplary embodiment, Algo(s(vecn[M]), q) of a key generating means according to the second exemplary embodiment is changed to the following algorithms Algo'(s(vecn[M]), t(vecn[M])).

C[M] is selected according to Normal(s(vecn[M]), t(vecn [M])).

C[M] is output.

An algorithm Dist'(C[u], C[v], vecn, vecn') is defined as follows.

$$C=C[u]+s(vecn')+Normal(2(C[v]-C[u]-s(vecn))\sqrt{(t(vecn')/t(vecn)), \sqrt{(t(vecn')t(vecn-vecn')/t(vecn)))}}$$

is true, and C is output.

The number of bits of a random number used for calculation by the algorithm Dist' is L", PRF"(K, •) is a pseudo random function using K as a key and an output is a pseudo random number of L" bits. RecEnc'(K', u, v, C[u], C[v], vecn, m) is replacement of (step 2RE4) of RecEnc(K', u, v, C[u], C[v], vecn, m) according to the second exemplary embodiment with the following process.

cc'=PRF"(K', s(vecn)∥(C[v]−C[u])∥s(vecn')) is calculated. Further, C[w]=Dist'(C[u], C[v], vecn, vecn'; cc') is calculated.

Next, processing executed by the encryption means will be described. The details of the processing executed by the encryption means 101 according to the present exemplary embodiment are as follows.

Figure 11:
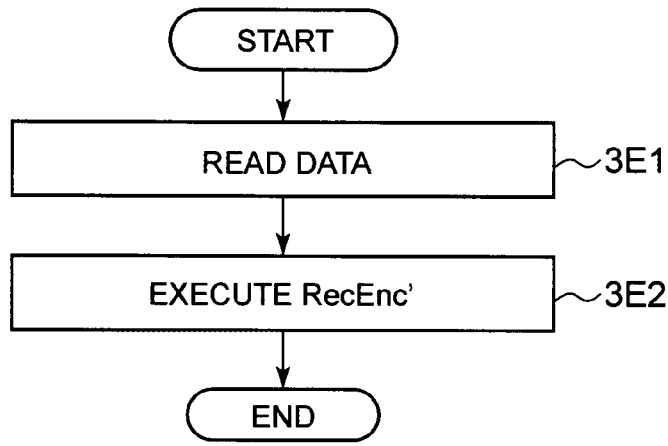
FIG. 11 It depicts a flowchart illustrating encryption processing according to a third embodiment.

The encryption means 101 receives K=(K', C[M], vecn [M]) as an input (step 3E1 in FIG. 11).

The encryption means 101 executes RecEnc'(K', −ζ−1, M, 0, C[M], vecn[M], m) (step 3E2 in FIG. 11).

Meanwhile, RecDec'(K', u, v, C[u], C[v], vecn, m) is replacement of (step 2RD4) of RecDec(K', u, v, C[u], C[v], vecn, m) according to the second exemplary embodiment with the following process.

cc'=PRF"(K', s(vecn)||(C[v]−C[u])||s(vecn')) is calculated. Further, C[w]=Dist'(C[u], C[v], vecn, vecn'; cc') is calculated.

Next, processing executed by the decryption means will be described. The details of the processing executed by the decryption means 201 according to the present exemplary embodiment are as follows.

Figure 12:
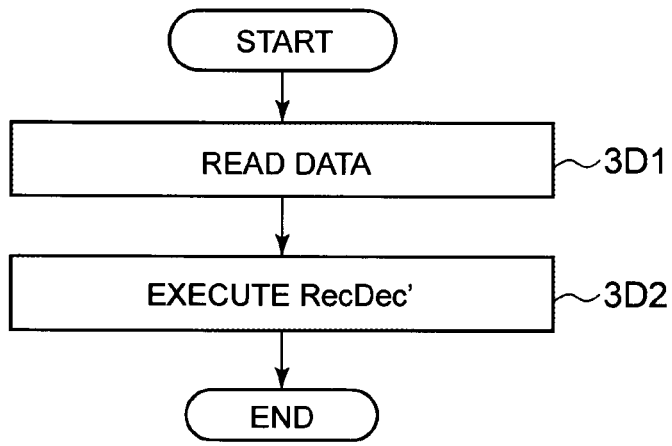
FIG. 12 It depicts a flowchart illustrating decryption processing according to the third embodiment.

The decryption means 201 receives K=(K', C[M], vecn [M]) as an input (step 3D1 in FIG. 12).

The decryption means 201 executes RecDec'(K', −ζ−1, M, 0, C[M], vecn[M], m) (step 3D2 in FIG. 12).

As described above, according to the present exemplary embodiment, it is possible to efficiently compare small and large sizes of plaintexts in an encrypted state in which security is guaranteed. Further, according to the present exemplary embodiment, it is possible to perform encryption and decryption processing by a more efficient method than that in the first exemplary embodiment.

Fourth Exemplary Embodiment

A ciphertext according to the fourth exemplary embodiment is obtained by adding a random number R to a ciphertext according to the first exemplary embodiment. A ciphertext is mixed by being added the random number R, so that higher security is guaranteed. A device configuration according to the fourth exemplary embodiment is the same as that of the first exemplary embodiment. Meanwhile, the present exemplary embodiment differs from the first exemplary embodiment in a function of each means.

In addition, in the present exemplary embodiment, ζ may be set to 0. The other parameters are the same as those in the first exemplary embodiment.

Next, processing executed by the key generating means will be described. The details of the processing executed by the key generating means 301 according to the present exemplary embodiment are as follows.

Similar to key generation processing according to the first exemplary embodiment, a key generating means 301 generates a key K'.

Next, the key generating means 301 selects the random number R of ρ bits.

Next, the key generating means 301 outputs a key K=(K', ρ).

Next, processing executed by the encryption means will be described. The details of the processing executed by the encryption means 101 according to the present exemplary embodiment are as follows.

The encryption means 101 reads K=(K', ρ) and the plaintext m from the storage unit 13.

Next, the encryption means 101 receives K' and m as an input, performs the same encryption processing as that in the first exemplary embodiment and obtains an output C'.

Next, the encryption means 101 outputs a ciphertext C=C'+R.

Next, processing executed by the decryption means will be described. The details of the processing executed by the decryption means 201 according to the present exemplary embodiment are as follows.

The decryption means 201 reads the key K=(K', R) and the ciphertext C from the storage unit 13.

Next, the decryption means 201 calculates C'=C−R.

Next, the decryption means 201 receives K' and C' as an input, performs the same decoding processing as that in the first exemplary embodiment and obtains the output m.

Next, the decryption means 201 outputs the plaintext m.

As described above, according to the present exemplary embodiment, it is possible to efficiently compare small and large sizes of plaintexts in an encrypted state in which security is guaranteed. Further, in the present exemplary embodiment, a ciphertext is mixed by being added the random number R, so that higher security is guaranteed compared to the first exemplary embodiment.

Fifth Exemplary Embodiment

In the fifth exemplary embodiment, a configuration of "the first exemplary embodiment" in the fourth exemplary embodiment is changed to the configuration of "the second exemplary embodiment". That is, the configuration described in the fourth exemplary embodiment is applied to the configuration described in the second exemplary embodiment. Further, according to the present exemplary embodiment, it is possible to perform encryption and decryption processing by a more efficient method than that in the fourth exemplary embodiment.

Sixth Exemplary Embodiment

In the sixth exemplary embodiment, a configuration of "the first exemplary embodiment" in the fourth exemplary embodiment is changed to the configuration of "the third exemplary embodiment". That is, the configuration described in the fourth exemplary embodiment is applied to the configuration described in the third exemplary embodiment. Further, according to the present exemplary embodiment, it is possible to perform encryption and decryption processing by a more efficient method than that in the fourth exemplary embodiment.

As described above, the present invention enables data search according to an order while securing security in, for example, a secure database. Consequently, the present invention is useful in preventing data from being read and is useful in using data by means of search.

As to novelty, although even a system disclosed in Non Patent Literature 1 performs recursion according to a bisection method similar to the second exemplary embodiment of the present invention, a distribution determining parameter guarantees novelty of the present invention. The system disclosed in Non Patent Literature 1 does not have data corresponding to a distribution determining parameter vecn according to the present invention. Recursion can be performed for the first time by determining a distribution based on the distribution determining parameter according to the present invention, so that the present invention is significantly different from the system disclosed in Non-Patent Literature 1 and involves novelty.

Further, the distribution determining parameter also guarantees inventive step of the present invention. By performing recursion using the distribution determining parameter, a ciphertext according to the second exemplary embodiment becomes the same as the ciphertext according to the first exemplary embodiment, and the invention according to the second exemplary embodiment also secures security as described above. The system disclosed in Non Patent Literature 1 does not secure security, so that the present invention involves inventive step.

Figure 13:
FIG. 13 It depicts a block diagram illustrating a minimum configuration example of an order-preserving encryption system.

Next, a minimum configuration of an order-preserving encryption system according to the present invention will be described. FIG. 13 is a block diagram illustrating a minimum configuration example of the order-preserving encryption system. As illustrated in FIG. 13, the order-preserving encryption system includes an encryption means 101 as a minimum component.

In the order-preserving encryption system employing the minimum configuration illustrated in FIG. 13, the encryption means 101 generates a ciphertext as a sum of data which complies with a distribution X determined in advance. Further, the encryption means 101 generates the ciphertext using the distribution X represented in a format that data of a bit length determined at random is selected at random according to a distribution matching the bit length.

Consequently, the order-preserving encryption system employing the minimum configuration can realize order-preserving encryption which can guarantee security.

In addition, in the present exemplary embodiment, a characteristic configuration of the order-preserving encryption system as indicated in following (1) to (7) is described.

(1) An order-preserving encryption system has an encryption means (realized by, for example, the encryption means 101) which generates a ciphertext as a sum of data (for example, $\alpha[j]$) which complies with a distribution X determined in advance, and the encryption means generates the ciphertext using as the distribution X a distribution represented in a format that data (for example, $\alpha[j]$) of a bit length (for example, $j[i]$) determined at random is selected at random according to a distribution (for example, $B[j]$) matching the bit length.

(2) A configuration may be employed where the order-preserving encryption system has a key generating means (for example, the key generating means 301) which selects data a number of items of which is proportional to a number of sources in plaintext space (for example, $(\alpha[-\zeta], \ldots, \alpha[N])$), and generates and outputs a set including all items of selected data as a key, and, when selecting the data, the key generating means selects a random number which determines a length of the data, and selects data of a bit length matching the selected random number.

(3) A configuration may be employed where, in the order-preserving encryption system, the encryption means adds up the data a number of items of which is proportional to a size of a plaintext (for example, $C=\Sigma_{i=-\zeta, \ldots, m}\alpha[i]$) to encrypt the plaintext using a key (for example, $K=(\alpha[-\zeta], \ldots, \alpha[N])$) including a set of a plurality of items of data for encryption.

(4) A configuration may be employed where the order-preserving encryption system has a decryption means (realized by, for example, the decryption means 201) which decrypts the ciphertext encrypted using a key (for example, $K=(\alpha[-\zeta], \ldots, \alpha[N])$) including a set of a plurality of items of data, and, to decrypt the ciphertext, the decryption means calculates for each m a value obtained by adding up the data the number of which is proportional to a size of m (for example, $\Sigma_{i=-\zeta, \ldots, m}\alpha[i]$), outputs the m the added value of which matches with the ciphertext, and notifies that the ciphertext is invalid when there is not the m which matches with the ciphertext.

(5) A configuration may be employed where the order-preserving encryption system has: an encryption device which has the encryption means which uses a key including a set of a plurality of items of data for encryption; and a decryption device which has a decryption means which decrypts the ciphertext encrypted using the key, and the order-preserving encryption system has a key generating means which selects data a number of items of which is proportional to a number of sources in plaintext space, and generates and outputs a set including all items of selected data as the key, when selecting the data, the key generating means selects a random number which determines a length of the data, and selects data of a bit length matching the selected random number, the encryption means receives an input of the key and a plaintext, adds up the data the number of items of which is proportional to a size of the plaintext and calculates the ciphertext to be encrypted, and the decryption means receives an input of the key and the ciphertext, calculates for each m a value obtained by adding up the data the number of which is proportional to a size of m, outputs the m the added value of which matches with the ciphertext, and notifies that the ciphertext is invalid when there is not the m which matches with the ciphertext.

(6) A configuration may be employed where the order-preserving encryption system has a key generating means which selects K' at random, selects a parameter vecn[M] which determines the distribution according to an algorithm determined in advance, receives an input of the vecn[M] as the parameter, and selects a ciphertext C[M] according to the distribution, and outputs a set including the K', the vecn[M] and the C[M] as a key.

(7) A configuration may be employed where, in the order-preserving encryption system, vecn[M] is a set including a plurality of items of data, and the key generating means selects the data included in the vecn[M] according to a binominal distribution under a condition that a total sum of the data is a value determined in advance.

Part or the entirety of the above exemplary embodiments can be described as in the following notes and, however, is by no means limited to the following notes.

(Supplementary note 1) In the order-preserving encryption system described in claim 6, vecn[M] is a set including a plurality of items of data, and the key generating means selects the data included in the vecn[M] according to a normal distribution under a condition that a total sum of the data is a value determined in advance.

(Supplementary note 2) In the order-preserving encryption system described in Supplementary note 1, an encryption means receives an input of a key and a plaintext and executes subroutine (for example, RecEnc'), and the subroutine includes: receiving an input of a section including the plaintext (for example, u, v), also receiving an input of a ciphertext corresponding to values at both ends of the section (for example, C[u], C[v]), also receiving an input of a distribution determining parameter vecn in the section, specifying a value w and calculating a ciphertext corresponding to w, dividing the section into two according to w, according to which one of the divided sections the plaintext belongs, receiving an input of the section to which the plaintext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input plaintext matches with one of the values ciphertexts of which are calculated, outputting the ciphertext.

(Supplementary note 3) In the order-preserving encryption system described in Supplementary note 2, vecn' is a set including a plurality of items of data, and the subroutine includes selecting the data included in the vecn' according to a hypergeometric distribution under a condition that a total sum of the data is a value determined in advance.

(Supplementary note 4) In the order-preserving encryption system described in Supplementary note 3, a determined distribution is obtained by adding a ciphertext corresponding to an end of the section to the hypergeometric distribution.

(Supplementary note 5) In the order-preserving encryption system described in Supplementary note 3, a determined distribution is a normal distribution.

(Supplementary note 6) In the order-preserving encryption system described in Supplementary note 1, a decryption means receives an input of a key and a ciphertext and executes a subroutine (for example, RecEnc'), and the subroutine includes: receiving an input of the input ciphertext which belongs to a section of ciphertext space (for example, C[u], C[v]), also receiving an input of a plaintext corresponding to the ciphertext corresponding to both ends of the section (for example, u, v), also receiving an input of a distribution determining parameter vecn in the section, specifying a value w and calculating a ciphertext C[w] corresponding to w, dividing the section into two according to C[w], according to which one of the divided sections the input ciphertext belongs, receiving an input of the section to which the input ciphertext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input ciphertext matches with one of the values ciphertexts of which are calculated, outputting the ciphertext.

(Supplementary note 7) In the order-preserving encryption system described in Supplementary note 6, a determined distribution is obtained by adding a ciphertext corresponding to an end of the section to the hypergeometric distribution.

(Supplementary note 8) In the order-preserving encryption system described in Supplementary note 6, a determined distribution is a normal distribution.

(Supplementary note 9) An order-preserving encryption system has: an encryption device which has an encryption means; and a decryption device which has a decryption means, and the order-preserving encryption system has a key generating means which selects K', selects a parameter vecn[M] which determines the distribution according to an algorithm determined in advance, receives an input of the vecn[M] as the parameter, and selects a ciphertext C[M] according to the distribution, and outputs a set including the K', the vecn[M] and the C[M] as a key, the encryption means receives an input of the key and the plaintext and executes a subroutine, the subroutine includes: receiving an input of a section including the plaintext, also receiving an input of a ciphertext corresponding to values at both ends of the section, also receiving an input of a distribution determining parameter vecn in the section, specifying a value w and calculating a ciphertext corresponding to w, dividing the section into two according to w, according to which one of the divided sections the plaintext belongs, receiving an input of the section to which the plaintext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input plaintext matches with one of the values ciphertexts of which are calculated, outputting the ciphertext, the decryption means receives an input of the key and the ciphertext and executes a subroutine, and the subroutine includes: receiving an input of the input ciphertext which belongs to a section of ciphertext space, also receiving an input of a plaintext corresponding to the ciphertext corresponding to both ends of the section, also receiving an input of a distribution determining parameter vecn in the section, specifying a value w and calculating a ciphertext C[w] corresponding to w, dividing the section into two according to C[w], according to which one of the divided sections the input ciphertext belongs, receiving an input of the section to which the input ciphertext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input ciphertext matches with one of the values ciphertexts of which are calculated, outputting the ciphertext.

(Supplementary note 10) The order-preserving encryption system has: an encryption device which has an encryption means; and a decryption device which has a decryption means, and the order-preserving encryption system has a key generating means which selects K', selects a parameter vecn[M] which determines the distribution according to an algorithm determined in advance, receives an input of the vecn[M] as the parameter, and selects a ciphertext C[M] according to the distribution, and outputs a set including the K', the vecn[M] and the C[M] as a key, vecn[M] is a set including a plurality of items of data, the key generating means selects the data included in the vecn[M] according to a binominal distribution under a condition that a total sum of the data is a value determined in advance, the encryption means receives an input of the key and the plaintext and executes a subroutine, the subroutine includes: receiving an input of a section including the plaintext, also receiving an input of a ciphertext corresponding to values at both ends of the section, also receiving an input of a distribution determining parameter vecn in the section, specifying a value w and calculating a ciphertext corresponding to w, dividing the section into two according to w, according to which one of the divided sections the plaintext belongs, receiving an input of the section to which the plaintext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input plaintext matches with one of the values ciphertexts of which are calculated, outputting the ciphertext, the vecn' is a set including a plurality of items of data, the encryption means selects the data included in the vecn' according to a hypergeometric distribution under a condition that a total sum of the data is a value determined in advance, the decryption means receives an input of the key and the ciphertext and executes a subroutine, the subroutine includes: receiving an input of the input ciphertext which belongs to a section of ciphertext space, also receiving an input of a plaintext corresponding to the ciphertext corresponding to both ends of the section, also receiving an input of a distribution determining parameter vecn in the section, specifying a value w and calculating a ciphertext C[w] corresponding to w, dividing the section into two according to C[w], according to which one of the divided sections the input ciphertext belongs, receiving an input of the section to which the input ciphertext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input ciphertext matches with one of the values ciphertexts of which are calculated, outputting the ciphertext, and a determined distribution is obtained by adding a ciphertext corresponding to an end of the section to the hypergeometric distribution.

(Supplementary note 11) The order-preserving encryption system has: an encryption device which has an encryption means; and a decryption device which has a decryption means, and the order-preserving encryption system has a key generating means which selects K', selects a parameter vecn[M] which determines the distribution according to an algorithm determined in advance, receives an input of the vecn[M] as the parameter, and selects a ciphertext C[M] according to the distribution, and outputs a set including the K', the vecn[M] and the C[M] as a key, vecn[M] is a set including a plurality of items of data, the key generating means selects the data included in the vecn[M] according to a binominal distribution under a condition that a total sum of the data is a value determined in advance, the encryption means receives an input of the key and the plaintext and executes a subroutine, the subroutine includes: receiving an input of a section including the plaintext, also receiving an input of a ciphertext corresponding to values at both ends of the section, also receiving an input of a distribution determining parameter vecn in the section, specifying a value w and calculating a ciphertext corresponding to w, dividing the section into two according to w, according to which one of the divided sections the plaintext belongs, receiving an input of the section to which the plaintext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and, when the input plaintext matches with one of the values ciphertexts of which are calculated, outputting the ciphertext, a determined distribution is obtained by adding a ciphertext corresponding to an end of the section to the hypergeometric distribution, the decryption means receives an input of the key and the ciphertext and executes a subroutine, the subroutine includes: receiving an input of the input ciphertext which belongs to a section of ciphertext space, also receiving an input of a plaintext corresponding to the ciphertext corresponding to both ends of the section, also receiving an input of a distribution determining parameter vecn in the section, specifying a value w and calculating a ciphertext C[w] corresponding to w, dividing the section into two according to C[w], according to which one of the divided sections the input ciphertext belongs, receiving an input of the section to which the input ciphertext belongs and recursively executing the subroutine, upon calculation of the ciphertext matching the w, first selecting a distribution determining parameter vecn' according to an algorithm determined in advance, then selecting the ciphertext matching the w according to a distribution selected using the vecn, the vecn' and the ciphertext corresponding to the values at the both ends of the section, using a pseudo random number upon selection of data according to the distribution, and when the input ciphertext matches with one of the values ciphertexts of which are calculated, outputting the ciphertext, and the determined distribution is a normal distribution.

Although the present invention has been described above with reference to the exemplary embodiments and an example, the present invention is by no means limited to the above exemplary embodiments and an example. The configurations and the details of the present invention can be variously changed within a scope of the present invention which one of ordinary skilled in art can understand.

This application claims priority to Japanese Patent Application No. 2011-111599 filed on May 18, 2011, the entire contents of which are incorporated by reference herein.

INDUSTRIAL APPLICABILITY

The present invention can be used for a secure database, for example. By storing data encrypted by the present invention in a database, it is possible to hold a data security and search for data according to the order, which is industrially applicable. It is expected that, accompanying recent development in a cloud computing technique, users are increasingly using a database and usefulness of the present invention will further improve in future.

REFERENCE SIGNS LIST

100 Encryption device
101 Encryption means
200 Decryption device
201 Decryption means
300 Key generating device
301 Key generating means

The invention claimed is:
1. An order-preserving encryption system, comprising:
memory that stores instructions; and
an encryption processor coupled to the memory and configured to execute the instructions to:
generate a ciphertext as a sum of data which complies with a distribution X determined in advance, wherein the distribution X is represented by data having a random bit length, and wherein the distribution X is selected at random according to a distribution matching the random bit length, and
calculate the ciphertext by using a function including a key and a distribution determining parameter on which the distribution X depends,
wherein the key comprises a set including a number of selected data items,
wherein the number of the selected data items is proportional to a number of sources in plaintext space representing a plaintext,
wherein, when the data items are selected, a random number which determines a data item bit length of the data items is selected and the data items matching the data item bit length are selected, and
wherein the cyphertext comprises an encryption of the plaintext for providing security for the plaintext.

2. The order-preserving encryption system according to claim 1, wherein the encryption processor is further configured to:
add up the selected data items to encrypt the plaintext using the key.

3. The order-preserving encryption system according to claim 1, further comprising a decryption processor configured to:
decrypt the ciphertext encrypted using the key,
wherein, decrypting the ciphertext includes:
calculating for each m of a plurality of m's, a value obtained by adding up the data items, wherein the plurality of m's correspond to the sources in the plaintext space,
outputting the value corresponding to the m which matches with the ciphertext as the plaintext, and
indicating that the ciphertext is invalid when a value corresponding to one of the plurality of m's does not match the ciphertext.

4. The order-preserving encryption system according to claim 1, further comprising:
a decryption processor that decrypt the ciphertext encrypted using the key; and
a key generating processor that is configured to generate and output the set including the selected data items as the key;
wherein the encryption processor is configured to:
receive the key and the plaintext;
add up the selected data items; and
calculate the ciphertext;
wherein the decryption processor is configured to:
receive the key and the ciphertext;
calculate, for each m of a plurality of m's, a value obtained by adding up the data items, wherein the plurality of m's correspond to the sources in the plaintext space;
output the value corresponding to the m which matches with the ciphertext; and
indicate that the ciphertext is invalid when a value corresponding to one of the plurality of m's does not match the ciphertext.

5. The order-preserving encryption system according to claim 1, further comprising:
a key generating processor that is configured to:
select[s] K' at random, wherein K' corresponds to the number of the selected data items;
select a parameter vecn[M], wherein M corresponds to a maximum number of sources belonging to the plaintext space, which determines the distribution according to an algorithm determined in advance,
receive an input of the vecn[M] as the parameter, and select a ciphertext C[M] according to the distribution, and
output the set including the K', the vecn[M] and the C[M] as the key, wherein the key is represented by K.

6. The order-preserving encryption system according to claim 5, wherein vecn[M] comprises the set including the selected data items, and the key generating processor is further configured to:
select the data included in the vecn[M] according to a binominal distribution under a condition that a total sum of the data is a value determined in advance.

7. The order-preserving encryption system according to claim 1, wherein the encryption processor is further configured to:
select the random number which determines the data item bit length of the data items when the data items are selected,
select the data items matching the data item bit length as the selected data items, and
generate the key comprising the set including the number of the selected data items.

8. The order-preserving encryption system according to claim 1, further comprising a key generating processor configured to:
select the random number which determines the data item bit length of the data items when the data items are selected,
select the data items matching the data item bit length as the selected data items, and
generate the key comprising the set including the number of the selected data items.

9. An order-preserving encryption method, implemented by a processor, comprising:
generating a ciphertext as a sum of data which complies with a distribution X determined in advance, wherein the distribution X is represented by data having a random bit length, and wherein the distribution X is selected at random according to a distribution matching the random bit length; and
calculating the ciphertext by using a function including a key and a distribution determining parameter on which the distribution X depends, wherein the key comprises a set including a number of selected data items, and wherein the number of the selected data items is proportional to a number of sources in plaintext space representing a plaintext; and
wherein, when the data items are selected, a random number which determines a data item bit length of the data items is selected, and the data items matching the data item bit length are selected, and
wherein the cyphertext comprises an encryption of the plaintext for providing security for the plaintext.

10. A non-transitory computer readable information recording medium storing an order-preserving encryption program which, when executed by a processor, performs a method comprising:
generating a ciphertext as a sum of data which complies with a distribution X determined in advance, wherein the distribution X is represented by data having a random bit length, and wherein the distribution X is selected at random according to a distribution matching the random bit length; and
calculating the ciphertext by using a function including a key and a distribution determining parameter on which the distribution X depends, wherein the key comprises a set including a number of selected data items, and wherein the number of the selected data items is proportional to a number of sources in plaintext space representing a plaintext; and
wherein, when the data items are selected, a random number which determines a data item bit length of the data items is selected, and the data items matching the data item bit length are selected, and
wherein the cyphertext comprises an encryption of the plaintext for providing security for the plaintext.

11. An encryption system, comprising:
an input terminal that inputs information; and
a processor that generates a ciphertext based on the information, wherein the processor generates the ciphertext as a sum that complies with a predetermined distribution X, wherein the distribution X is represented by data, which has a random bit length, and wherein the distribution X is randomly selected according to a distribution matching the random bit length, wherein the processor calculates the ciphertext based on a function comprising a key and a distribution determining parameter on which the distribution X depends, and wherein the key comprises a set including a number of selected data items, and wherein the number of the selected data items is proportional to a number of sources in plaintext space representing a plaintext; and wherein, when the data items are selected, a random number which determines a data item bit length of the data items is selected, and the data items matching the data item bit length are selected, and wherein the cyphertext comprises an encryption of the plaintext for providing security for the plaintext.

12. The encryption system according to claim 11, wherein the processor adds up the selected data items that is proportional to a size of the plaintext and encrypts the plaintext using the key.

* * * * *